Patented Apr. 9, 1940

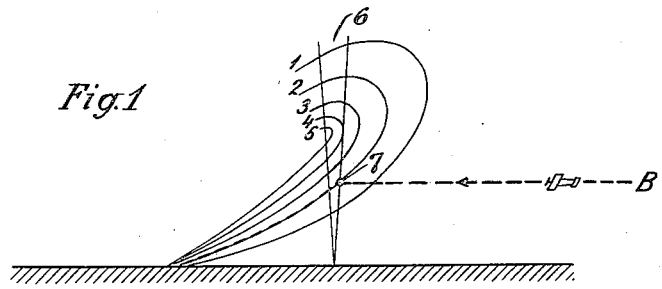
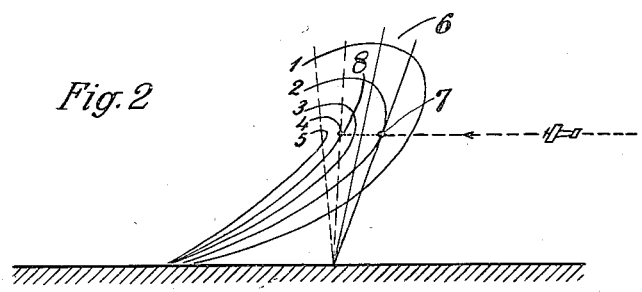
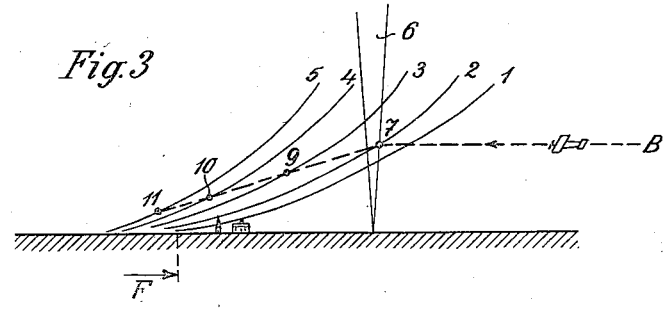

2,196,674

UNITED STATES PATENT OFFICE 2,196,674

METHOD FOR LANDING AIRPLANES

Walter Max Hahnemann, Berlin-Marienfelde, and Ernst Kramar, Berlin-Tempelhof, Germany, assignors to C. Lorenz Aktiengesellschaft, Berlin-Tempelhof, Germany, a company Application April 26, 1934, Serial No. 722,470
In Germany May 10, 1933

10 Claims. (Cl. 250—11)

It is well-known for the purpose of facilitating the landing of airplanes to employ so-called slip-way beacons which radiate a club-shaped bundle of ultra-short electro-magnetic waves at a certain angle to the ground surface. When using this method, upon landing the airplane descends on a curve of constant field intensity. In order to be able to carry out this method reliably, it has hitherto been necessary to ensure that the transmitter maintains its power continuously constant and that the receiver always has the same sensitivity. On the transmitter side the equipment can be relatively easily fulfilled, since not only the transmitter but also the transmitter field can be supervised. On the receiving side, however, considerable difficulty is experienced as the sensitivity of the receiver must remain the same over long periods of time. To give an example in a Berlin to London flight, the receiver which has to be adjusted in Berlin must maintain a constant sensitivity until landing in London, which will take place several hours after. It is, of course, possible to disconnect the receiver during the journey, but upon re-insertion before the actual landing in London it must have the same sensitivity. It will easily be seen that this is not easy to do on account of the extraordinarily high sensitivity of modern receivers.

According to the invention it is proposed to carry out this slip-way beacon method in such a way that the beginning of the landing is indicated by an additional signal indication and that the indication of field intensity which exists at the moment of the reception of the additional signal indication is employed to determine the actual landing path.

Figure 4:
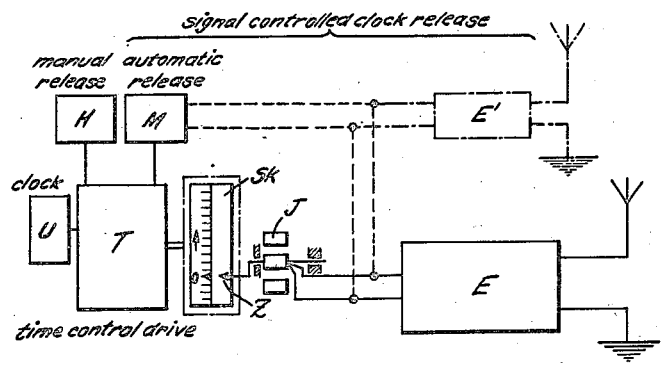
Figure 5:
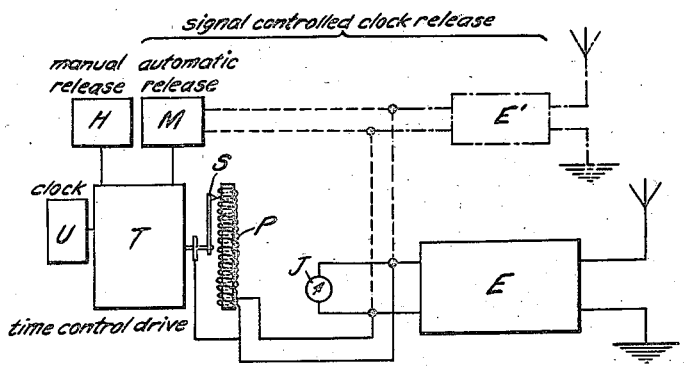

The invention will be fully appreciated from a consideration of the following description taken in conjunction with the accompanying drawings in which:

Figs. 1, 2 and 3 each show an elevation of a landing ground and Figs. 4 and 5 show receiving systems having variable sensitivity indicators for use on an airplane.

1 to 5 designate the curves of different field intensity of a bundle of rays directed in the well-known manner obliquely upwards or of two bundles of rays alternately manipulated in order to obtain a zone of equal intensity, or an annular torus-shaped radiation diagram. The invention may be employed in all methods of this kind. If required suitable devices may be employed to indicate the direction in which landing should be effected. The track of the airplane is designated by B.

The method hitherto employed is based on the fact that the airplane, which in the first instance arrives horizontally flies in the bundle of rays until it arrives at the field intensity in which it must descend. As soon as a predetermined deflection of the indicating device of the receiver is reached, the airplane descends. This, as has already been explained in the foregoing, requires the sensitivity of the receiver to have remained constant.

According to the invention the point at which the landing should be commenced is given by an additional signal indication 6 which, as shown in Fig. 1 is directed perpendicularly, or as shown in Fig. 2 obliquely upwards. This additional indication may either be given acoustically or by wireless. With the oblique direction it may be preferable to give it by wireless. The airplane flies on horizontally until it reaches point 7, at which it receives the indication 6. It then descends from point 7 so that the deflection of the indicating device remains the same as it was at the moment of the arrival of the signal indication 6. The actual degree of deflection of the indicating device is immaterial and it does not matter if the sensitivity of the receiver has altered since the commencement of the journey. The indicating device now fulfills the problem of ensuring during the short period of landing the descent on a curve of equal field intensity.

The oblique direction of the signal indication 6 shown in Fig. 2 has the advantage that an airplane whose horizontal track of flight B is higher than in Fig. 1 likewise descends on the field intensity curve 2 and not on the field intensity curve 4, for which point 8 indicates the beginning of the landing. For comparison, in Fig. 2 the perpendicular designation is indicated in dotted lines.

According to a further feature of the invention the landing may be so made that, in order to obtain a desired landing path, from the reception of the additional indication 6 curves of different field intensity are cut, the sensitivity of the indicating device of the receiver being varied in dependence upon time.

This method is preferable for the following reasons. If the landing is made from a considerable height, for example 400 m., using a slip-way beacon which normally is employed for landing from about 150 m., then the airplane must descend very steeply in the upper part of the curve and can only descend at a permissible steepness from about 200 m. If the radiation diagram of the slip-way beacon is made flatter, then landing from a greater height becomes possible, but flatter curves can only very rarely be used as the landing grounds available are generally too small for flat curves which require a large area. It also follows that the conditions are not the same for all types of airplanes. Since one machine can descend more steeply than another the "flattening out" time and thus also the amount of space required are different according to the landing speeds of different machines. The method referred to has the advantage that it is possible to depart from the curve of the same field intensity, that is, by intersecting a number of landing curves any desired landing path can be established.

This is illustrated in Fig. 3. Up to the beginning of landing at point 7 the method is the same as that described with reference to Figs. 1 and 2. As the field intensity curves 1 and 2 extend far outside the territory of the aerodrome F in the vicinity of ground, safe landing along one of these curves is impossible on account of buildings and other obstructions. If, however, the curves 3, 4 and 5 are intersected by the airplane this does not descend on the field intensity curve 2, but flies on to the point 9, that is the intersection with the curve 3, further to the point 10, that is the intersection with the curve 4, and then to the point 11, the intersection with the curve 5. This is effected by changing the sensitivity of the indicating device from the point 7 in dependence on time. The change need not take place linearly as shown in Fig. 3, but may be according to any desired law, in other words the landing path can be predetermined as desired by the position of the points of intersection 7, 9, 10 and 11, and thus adapting the landing path to the aerodrome and to the type of airplane.

The arrangement for carrying out this method is not shown in detail, as it involves only simple modification to known devices. Either a shunt or a series resistance can be connected to the indicating device, the size of which resistance is varied dependent upon time by a clock or the like, the arrangement being so constructed that the clock is set in operation at the moment of reception of the additional indication 6.

It is also possible to employ a specially constructed indicating device such as is shown by way of an example in Figs. 4 and 5.

The indicating device of which the scale and pointer Z is shown in Fig. 4 is located in the well known manner in the output circuit of the receiving device. The scale Sk is not fixed as is usual in such instruments, but is moved dependent upon the time, for example in the direction of the arrow of Fig. 4. The pilot, however, has to steer so that the pointer Z always points to the zero dash of the scale, that is, the sensitivity of the instrument is apparently changed with respect to the reading.

Fig. 4 illustrates the airplane equipment in which the indicating instrument J is connected in the output of a radio receiver E and is provided with a movable pointer Z. The movable scale SK of the indicating instrument may be slowly moved by a clockwork mechanism U connected by time control drive T to the shaft of the movable scale Sk. Normally, the time control drive is locked against operation. By means of a manual release H, the clock driven time control drive may be released at the moment when the upwardly directed signal is received. The release may also be effected automatically by automatic release M connected to the output circuit of the radio receiver E. If desired, a separate radio receiver E' may be employed for controlling the automatic release M.

Fig. 5 shows an alternative arrangement, differing from that of Fig. 4 in the type of indicating instrument employed. In Fig. 5 the indicating instrument J, instead of having a movable scale, has its sensitivity controlled in accordance with time by means of a resistance P connected across the output circuit of the indicating instrument J. The resistance P is varied by the clockwork mechanism U acting through time controlled drive T by rotating a sliding contact S over the resistance. This type of indicating device is more fully disclosed in U. S. Patent 1,999,047.

The additional signal indication may be given by means of devices which are in themselves well known, and arrangements for indicating the landing ground boundaries are readily adaptable for the purpose. In the simplest case a parabolic reflector may be employed which concentrates a beam of electromagnetic rays perpendicularly or obliquely upwards. It is also possible to employ an arrangement to obtain a zone of equal intensity, that is an arrangement which operates by means of vertical polarisation. Such an arrangement is described for example in the co-pending U. S. application Ser. No. 638,907 filed October 21, 1932, which has now issued as Patent No. 2,028,510 that shows a vertical dipole which is continuously fed by one transmitter, and two dipoles acting as reflectors. These reflector dipoles are alternately manipulated according to one of the known methods, for example in the a-n-rhythm. Thus in the well-known manner a zone of equal intensity is obtained, that is by the fact that the circular radiation diagram of the middle dipole continuously fed by the transmitter is alternately distorted so as to be displaced to one side and then to the other side in a pattern of oblate shape. If an airplane flies over such an arrangement the reception on this airplane stops because the transmitter is operating with vertical polarisation. The moment of stoppage is extremely sharply defined so that it may be employed as the said additional indication and possibly for the automatic release of the mechanism, in order to change the sensitivity of the indicating device in dependence upon time. It is also possible to employ a plane of radiation instead of a bundle of rays, this plane being penetrated by the airplane. These arrangements are preferably such that two transmitters are installed at two diagonally opposite corners of the aerodrome each transmitter providing two sides of the aerodrome with such planes of radiation. If an acoustic indication is employed, then suitable directing means may be used for the sound transmitters or sound transmitting combinations.

What is claimed is:

1. The method of landing airplanes which comprises radiating a short wave field of electromagnetic energy at an angle to the ground, directing a signal upwardly to intersect said field at a point in space from which landing of the airplane should be commenced, and utilizing the indication on the airplane of the field intensity of said wave field which prevails at the moment of reception of said signal at said intersection as an indication of constant value defining a landing path for the airplane.

2. The method of landing airplanes which comprises radiating a short wave field of electromagnetic energy at an angle to the ground to define a landing path for the airplane, directing a signal upwardly to intersect said landing path at a point in space from which landing of the airplane should be commenced, and utilizing the indication on the airplane of the field intensity which prevails at said intersection as a constant indication in following the defined landing path.

3. The method of landing airplanes which comprises radiating a short wave field at an angle to the ground employing the constant field intensity curve thereof to define a landing path for the airplane, directing a signal upwardly to intersect said constant field intensity curve at the point in space from which landing of the airplane should be commenced, and utilizing the indication on the airplane of the field intensity which prevails at the moment of reception of said signal at said intersection as a constant indication in following the defined landing path.

4. The method of landing airplanes which comprises radiating a plurality of beams of electromagnetic energy having curves of different field intensities at progressively varying angles to the ground, directing a signal upwardly to intersect one of said curves at a point in space from which landing should be commenced, and utilizing the indication on the airplane of the field intensity which prevails at the moment of reception of said signal at said intersection as a reference level for determining the field intensities thereafter required for defining a predetermined landing path for the airplane crossing other of said curves.

5. The method of landing airplanes according to claim 1, wherein the upwardly directed signal is audible.

6. The method of landing airplanes which comprises radiating a short wave field of electromagnetic energy at an angle to the ground, directing a signal upwardly to intersect said field at a point in space at which landing of the airplane should be commenced, and utilizing the indication on the airplane of the field intensity of said wave field which prevails at the moment of reception of said signal at said intersection to control a predetermined variation thereof in accordance with time so as to define a landing path for the airplane.

7. The method of landing airplanes which comprises radiating a short wave field of electromagnetic energy at an angle to the ground, directing a signal upwardly to intersect said field at a point in space at which landing of the airplane should be commenced, and utilizing the indication on the airplane of the field intensity of the wave field which prevails at the moment of reception of said signal at said intersection to define a landing path for the airplane which is governed by the sensitivity of reception which varies in accordance with a non-linear law.

8. The method of landing airplanes which comprises radiating a short wave field of electromagnetic energy at an angle to the ground, directing a signal upwardly to intersect said field at a point in space from which landing of the airplane should be commenced, and utilizing the indication on the airplane of the field intensity of said short wave field which prevails at the moment of reception of said signal at said intersection as a reference level with which to compare the field intensities subsequently observed in landing the airplane within said short wave field.

9. The method of landing airplanes which comprises radiating a short wave field of electromagnetic energy at an angle to the ground to define a landing path for the airplane, directing a signal upwardly to intersect said landing path at a point in space from which landing of the airplane should be commenced, and utilizing the indication on the airplane of the field intensity which prevails at said intersection as a reference level with which to compare the field intensities subsequently observed in following the defined landing path.

10. The method of landing airplanes according to claim 8, wherein the upwardly directed signal is transmitted at an angle to the vertical.

WALTER MAX HAHNEMANN.
ERNST KRAMAR.